United States Patent
Takeuchi

(10) Patent No.: US 12,236,316 B2
(45) Date of Patent: Feb. 25, 2025

(54) INFORMATION PROCESSING DEVICE AND INFORMATION PROCESSING METHOD

(71) Applicant: SONY GROUP CORPORATION, Tokyo (JP)

(72) Inventor: Yuichiro Takeuchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/044,370

(22) PCT Filed: Jan. 19, 2021

(86) PCT No.: PCT/JP2021/001580
§ 371 (c)(1),
(2) Date: Mar. 7, 2023

(87) PCT Pub. No.: WO2022/059220
PCT Pub. Date: Mar. 24, 2022

(65) Prior Publication Data
US 2023/0359845 A1 Nov. 9, 2023

Related U.S. Application Data

(60) Provisional application No. 63/079,019, filed on Sep. 16, 2020.

(51) Int. Cl.
*G06K 7/14* (2006.01)
(52) U.S. Cl.
CPC ......... *G06K 7/1443* (2013.01); *G06K 7/1417* (2013.01)
(58) Field of Classification Search
CPC .................................................. G06K 7/1443
USPC ....................................................... 235/492.09
See application file for complete search history.

(56) References Cited

U.S. PATENT DOCUMENTS

| | | | | |
|---|---|---|---|---|
| 9,928,632 | B1* | 3/2018 | Barnum | G06T 3/40 |
| 2009/0016568 | A1* | 1/2009 | Kamijoh | G06K 7/12 |
| | | | | 382/100 |
| 2011/0154174 | A1* | 6/2011 | Liu | G06F 16/9554 |
| | | | | 715/205 |
| 2012/0050753 | A1* | 3/2012 | Rakshit | G06K 15/4095 |
| | | | | 358/1.14 |

(Continued)

FOREIGN PATENT DOCUMENTS

| | | |
|---|---|---|
| JP | 2002-087532 A | 3/2002 |
| JP | 2004-096375 A | 3/2004 |

(Continued)

OTHER PUBLICATIONS

International Search Report and Written Opinion of PCT Application No. PCT/JP2021/001580, issued on Apr. 20, 2021, 09 pages of ISRWO.

(Continued)

*Primary Examiner* — Allyson N Trail
(74) *Attorney, Agent, or Firm* — CHIP LAW GROUP

(57) ABSTRACT

An information processing device includes a recognition unit that recognizes, from a composite image generated using a code image and a cover image, the code image. The recognition unit recognizes the code image from the composite image using a recognizer trained so that a recognition result of the code image and a recognition result of the composite image are identical to each other.

14 Claims, 8 Drawing Sheets

(56) References Cited

U.S. PATENT DOCUMENTS

| | | | | |
|---|---|---|---|---|
| 2013/0228615 A1* | 9/2013 | Gates | .................. | G06F 16/00 |
| | | | | 235/375 |
| 2015/0014417 A1* | 1/2015 | Finlow-Bates | .... | H04N 21/6581 |
| | | | | 235/494 |
| 2015/0088637 A1* | 3/2015 | Muguchi | .................. | G06T 7/70 |
| | | | | 705/14.45 |
| 2018/0365460 A1* | 12/2018 | Barnum | .................. | G06T 3/40 |
| 2020/0195900 A1* | 6/2020 | Sodhi | .................. | H04N 9/3194 |

FOREIGN PATENT DOCUMENTS

| | | |
|---|---|---|
| JP | 2008-033625 A | 2/2008 |
| JP | 2016-130895 A | 7/2016 |

OTHER PUBLICATIONS

Yamauchi et al., "Embedding and rRestoration of QR Code for Images Using CNN", Electronics Research Institute, Japan, General Incorporated Electric Engineers, Jan. 7, 2020, pp. 15-18.

\* cited by examiner

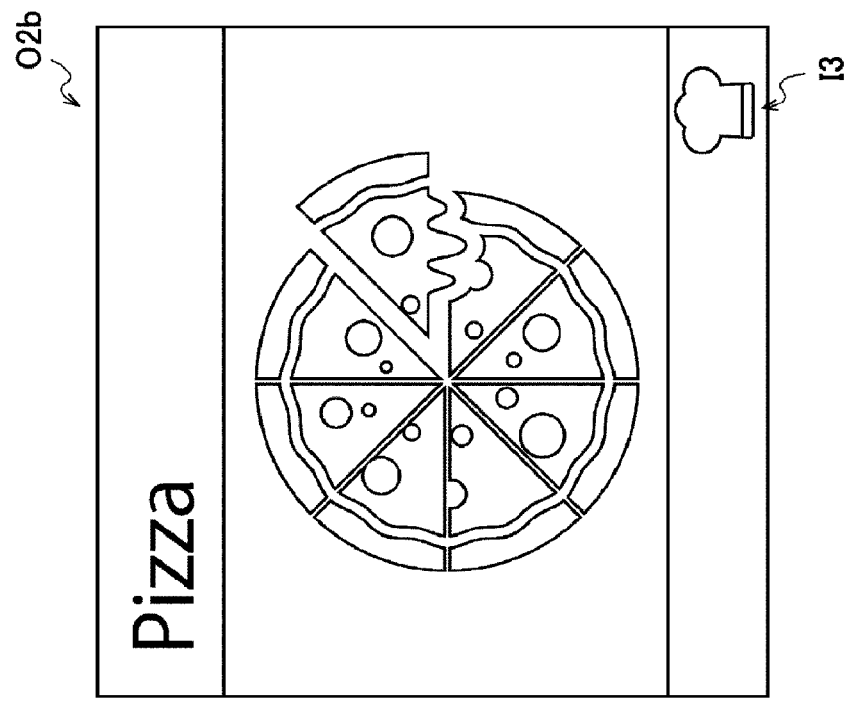
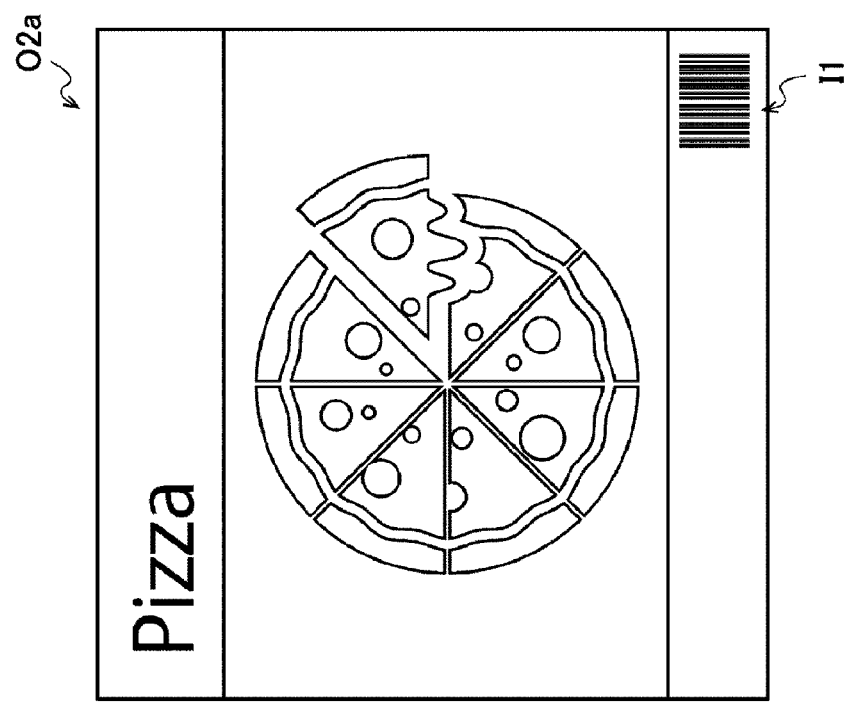
FIG. 7

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/001580 filed on Jan. 19, 2021, which claims priority benefit of U.S. Provisional Application No. 63/079,019 filed in the US Patent Office on Sep. 16, 2020. Each of the above-referenced applications is hereby incorporated herein by reference in its entirety.

TECHNICAL FIELD

The present disclosure relates to an information processing device, an information processing method, and a program.

BACKGROUND ART

In recent years, various two-dimensional codes have been developed and widely utilized. For example, Patent Document 1 discloses a distribution management system utilizing a two-dimensional code.

CITATION LIST

Patent Document

Patent Document 1: Japanese Patent Application Laid-Open No. 2002-87532

SUMMARY OF THE INVENTION

Problems to be Solved by the Invention

The two-dimensional code can store and read various kinds of information and implement services using the information. However, the two-dimensional code may not be adapted to an environment where it is used, because it has commonly a unique appearance according to schemes.

Solutions to Problems

One aspect of the present disclosure provides an information processing device including a recognition unit that recognizes, from a composite image generated using a code image and a cover image, the code image, in which the recognition unit recognizes the code image from the composite image using a recognizer trained so that a recognition result of the code image and a recognition result of the composite image are identical to each other.

In addition, another aspect of the present disclosure provides an information processing method including recognizing, from a composite image generated using a code image and a cover image, the code image by a processor, in which the recognizing further includes recognizing the code image from the composite image using a recognizer trained so that a recognition result of the code image and a recognition result of the composite image are identical to each other.

In addition, still another aspect of the present disclosure provides a program for causing a computer to function as an information processing device that includes a recognition unit that recognizes, from a composite image generated using a code image and a cover image, the code image, in which the recognition unit recognizes the code image from the composite image using a recognizer trained so that a recognition result of the code image and a recognition result of the composite image are identical to each other.

BRIEF DESCRIPTION OF DRAWINGS

FIG. 7 is a diagram for describing improvement in design by the composite image I3 according to the embodiment.

MODE FOR CARRYING OUT THE INVENTION

Figure 1:
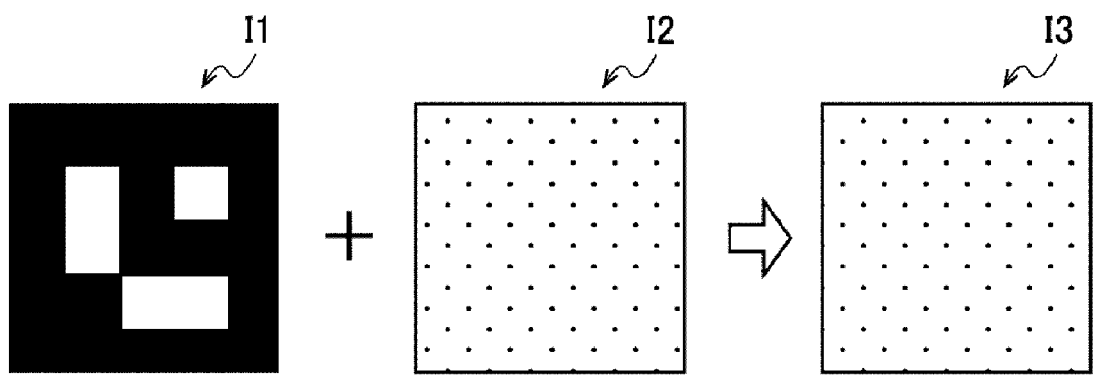
FIG. 1 is a diagram for schematically describing a composite image according to an embodiment of the present disclosure.

A preferred embodiment of the present disclosure will now be described in detail with reference to the accompanying drawings. It should be noted that, in the present specification and the drawings, constituent elements having substantially the same functional configuration are designated by the same reference numerals, and a redundant description will be omitted.

Note that the description will be given in the following order.

1. Embodiment
1.1. Overview
1.2. Configuration example
1.3. Details of learning
1.4. Application example
2. Hardware configuration example
3. Summary

1. Embodiment

1.1. Overview

First, an overview of an embodiment of the present disclosure will be described.

As described above, various two-dimensional codes have been developed and widely utilized in recent years. The two-dimensional code is used in a wide variety of fields such as tracking in logistics, advertisement deployment in marketing, payment in sales, and various types of control in the robotics field.

According to the two-dimensional code as currently widely used, information can be easily stored and read, and various systems as described above can be constructed.

However, the two-dimensional code may be conspicuous more than necessary in an environment where it is used, because it has commonly a unique appearance according to schemes.

For example, suppose that a two-dimensional code is used in a historical building or area. In this case, the two-dimensional code appears extremely modern with respect to the atmosphere of the building, the area, or the like, and may give an impression inappropriate for the atmosphere of the place.

In addition, suppose that a two-dimensional code is used for machine control (route control of an autonomous mobile body as an example) of an autonomous mobile body or the like, for example. In this case, the two-dimensional code is a medium unrelated to a person. For this reason, some people may feel uncomfortable in the environment in which many two-dimensional codes as described above are used.

The technical idea according to the embodiment of the present disclosure is conceived of by focusing on the above points, and implements practical application of a code that is more adapted to an environment.

For this purpose, the embodiment of the present disclosure applies a machine learning technique referred to as an adversarial example. The adversarial example generally refers to an image generated to cause misclassification in a classification model.

For example, it is assumed that there is an image commonly classified as "dog" in the classification model. The image is naturally recognized as a "dog" by a person.

On the other hand, according to the adversarial example generated by adding noise indistinguishable to human eyes to the image, it is possible to classify a class that is originally a "dog" as another class (for example, a car or the like).

That is, according to the adversarial example, it is possible to create images whose contents will be perceived entirely differently by human eyes and computer vision.

In view of this, a recognition device 20 according to the embodiment of the present disclosure includes a recognition unit 210 that recognizes, from a composite image generated using a code image and a cover image, the code image. In addition, one of the features of the recognition unit 210 according to the embodiment of the present disclosure is to recognize the code image from the composite image using a recognizer trained so that a recognition result of the code image and a recognition result of the composite image are identical to each other.

FIG. 1 is a diagram for schematically describing a composite image according to the embodiment of the present disclosure.

FIG. 1 illustrates an example of an arbitrary code image I1, an arbitrary cover image I2, and a composite image I3 generated from the code image I1 and the cover image I2.

Here, the code image I1 according to the present embodiment may be, for example, an image corresponding to various codes according to any scheme.

For example, a commonly distributed two-dimensional code may be used or a unique code designed according to applications may be used for the code image I1 according to the present embodiment.

In addition, the cover image I2 according to the present embodiment is an image used to conceal the code image I1 from human eyes. That is, an image desired to be perceived by a person is used as the cover image I2 according to the present embodiment.

For example, the cover image I2 according to the present embodiment may be selected according to an environment in which the composite image I3 is attached or displayed.

As an example, the cover image I2 according to the present embodiment may be an image in which a texture of an object to which the composite image I3 is attached or displayed is reproduced.

For example, in a case where the composite image I3 according to the present embodiment is attached to a woodgrain wall surface, the cover image I2 may be an image in which a woodgrain texture of the wall surface is reproduced.

In this case, the composite image I3 generated using the code image I1 and the cover image I2 may be an image having higher pixel-based similarity to the cover image I2 than the code image I1.

Furthermore, the composite image I3 according to the present embodiment may be defined as an image from which the code image I1 is unrecognizable by another recognition device (for example, a typical QR code reader in a case where a QR code (registered trademark) is used for the code image I1), which is capable of recognizing the code image I1 on the basis of a certain image feature, from the composite image I3 on the basis the certain image feature.

The composite image I3 as described above appears as the cover image I2 for human eyes, while the code image I1 can be recognized by computer vision.

Figure 2:
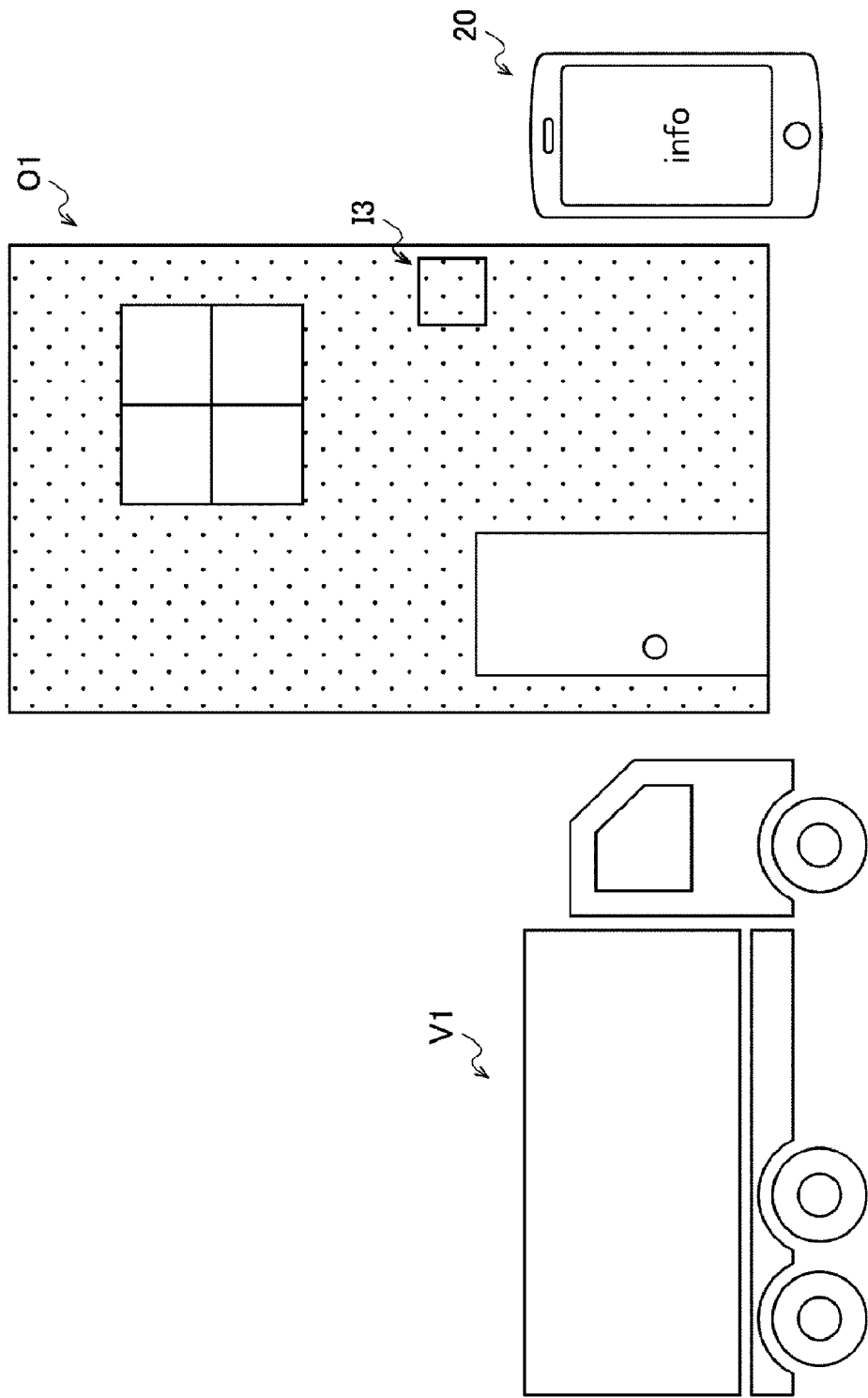
FIG. 2 is a diagram illustrating an example of practical application of a composite image I3 according to the embodiment.

FIG. 2 is a diagram illustrating an example of practical application of the composite image I3 according to the present embodiment. FIG. 1 illustrates an object O1 that is a building. The composite image I3 generated using the cover image I2 obtained by reproducing (imaging) the texture of the outer wall is attached on the outer wall of the object O1.

In this case, the composite image I3 has an appearance substantially similar to that of the outer wall of the object O1, and thus is not noticeable to human eyes and is adapted well to the environment.

On the other hand, the code image I1 in the composite image I3 can be recognized by the recognition device 20 implemented as, for example, a smartphone.

Therefore, the recognition device 20 can read various types of information stored in the code image I1 by imaging the composite image I3. Furthermore, the recognition device 20 can execute various operations according to the read information. Examples of the operations include access to an Internet site and AR display. In a case where the attachment position of the composite image I3 changes or the composite image I3 is dynamically displayed, the composite image I3 is also applicable to gesture recognition and motion recognition.

In addition, the recognition device 20 according to the present embodiment may be mounted on various autonomous mobile bodies such as an automated vehicle V1, for example. In this case, the automated vehicle V1 can read various types of information stored in the code image I1 by imaging the composite image I3, and perform an autonomous operation according to the read information.

As described above, the technical idea of the present embodiment can provide a code that is not recognized by a person as a code but is recognizable by computer vision.

Furthermore, the technical idea enables practical application of the code in, for example, a historical building or area as described above without impairing the atmosphere of the place.

In addition, even in a case where the code is used for machine control (as an example, route control of an autonomous mobile body) of an autonomous mobile body or the like, it is possible to operate the code without making a person conscious of the code.

1.2. Configuration Example

Next, a configuration example of a system that achieves the above effect will be described in detail.

(Learning Device 10)

First, a functional configuration of a learning device 10 according to the present embodiment will be described.

The learning device 10 according to the present embodiment is an information processing device that performs one or both of learning related to generation of the composite image I3 and learning related to recognition of the code image I1 from the composite image I3.

Figure 3:
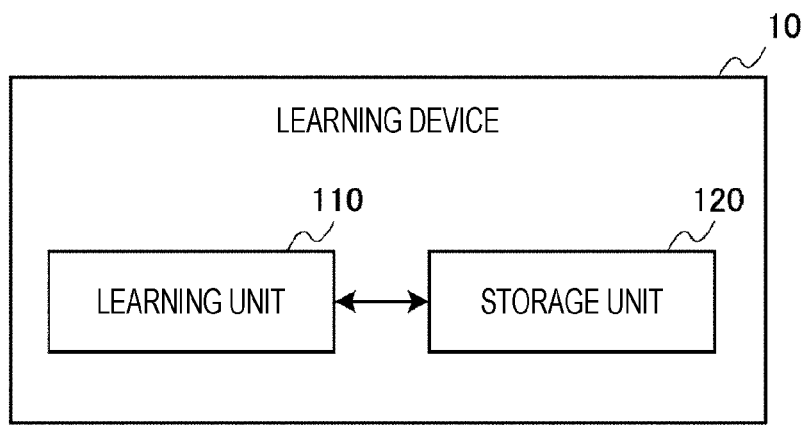
FIG. 3 is a block diagram illustrating a functional configuration example of a learning device 10 according to the embodiment.

FIG. 3 is a block diagram illustrating a functional configuration example of the learning device 10 according to the present embodiment. As illustrated in FIG. 3, the learning device 10 according to the present embodiment may include a learning unit 110 and a storage unit 120.

(Learning Unit 110)

The learning unit 110 according to the present embodiment performs one or both of learning related to generation of the composite image I3 and learning related to recognition of the code image I1 from the composite image I3.

The learning unit 110 according to the present embodiment performs learning as described above using a neural network.

The function of the learning unit 110 according to the present embodiment is implemented by a processor such as a GPU. Note that details of learning by the learning unit 110 will be separately described.

(Storage Unit 120)

The storage unit 120 according to the present embodiment stores various types of information regarding learning executed by the learning unit 110. For example, the storage unit 120 stores a structure of a network used for learning by the learning unit 110, various parameters related to the network, learning data, and the like.

The functional configuration example of the learning device 10 according to the present embodiment has been described above. Note that the functional configuration described above with reference to FIG. 3 is merely an example, and the functional configuration of the learning device 10 according to the present embodiment is not limited thereto.

For example, the learning device 10 according to the present embodiment may further include an operation unit that receives an operation by a user, a display unit that displays various types of information, and the like.

The functional configuration of the learning device 10 according to the present embodiment can be flexibly modified according to specifications and operations.

(Recognition Device 20)

Subsequently, a functional configuration example of the recognition device 20 according to the present embodiment will be described.

The recognition device 20 according to the present embodiment is an information processing device that recognizes the code image I1 from the composite image I3.

The recognition device 20 according to the present embodiment may be implemented as, for example, a smartphone, a tablet, a wearable device, or a dedicated reader. In addition, the recognition device 20 according to the present embodiment may be mounted on various autonomous mobile bodies such as an automated vehicle, a drone, or a robot.

Figure 4:
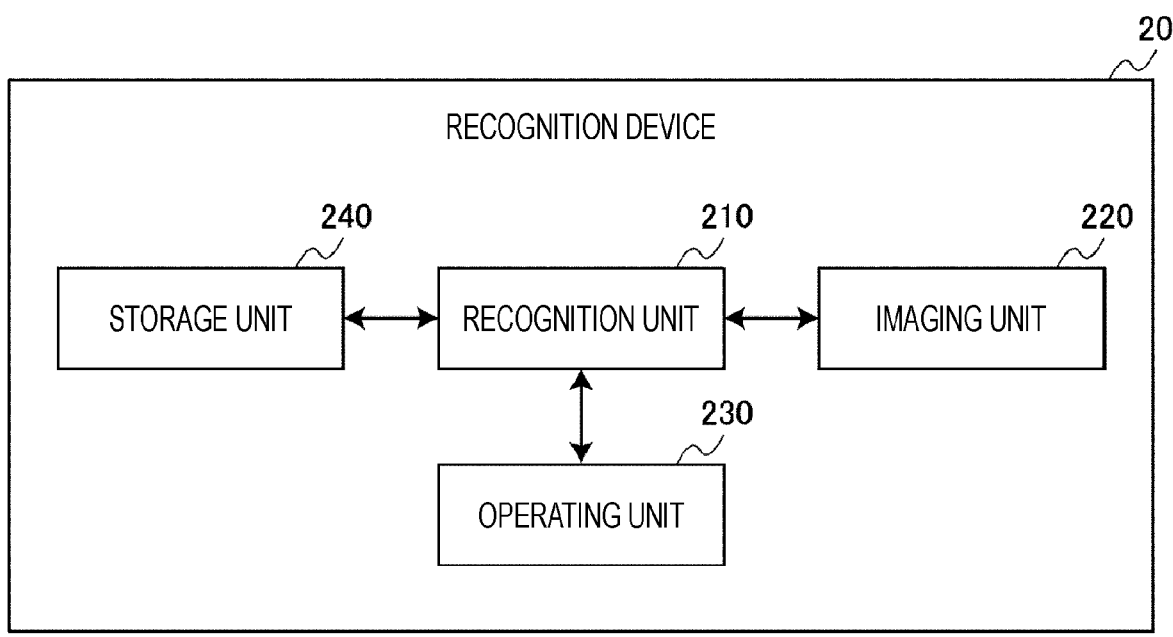
FIG. 4 is a block diagram illustrating a functional configuration example of a recognition device 20 according to the embodiment.

FIG. 4 is a block diagram illustrating a functional configuration example of the recognition device 20 according to the present embodiment. As illustrated in FIG. 4, the recognition device 20 according to the present embodiment may include a recognition unit 210, an imaging unit 220, an operating unit 230, and a storage unit 240.

(Recognition Unit 210)

The recognition unit 210 according to the present embodiment recognizes the code image I1 from the composite image I3 generated using the code image I1 and the cover image I2.

In addition, one of the features of the recognition unit 210 according to the present embodiment is to recognize the code image I1 from the composite image I3 using a recognizer trained so that a recognition result of the code image I1 and a recognition result of the composite image I3 are identical to each other.

The recognition unit 210 according to the present embodiment can read information from the composite image I3 that is not perceived as a code by human eyes and utilize the information for various applications.

The function of the recognition unit 210 according to the present embodiment is implemented by various types of processors such as a GPU. Note that details of the functions of the recognition unit 210 according to the present embodiment will be separately described.

(Imaging Unit 220)

The imaging unit 220 according to the present embodiment images the surrounding environment. The imaging unit 220 according to the present embodiment may perform imaging particularly using the composite image I3 located in the surrounding environment as a subject.

For this purpose, the imaging unit 220 according to the present embodiment includes various imaging elements.

(Operating Unit 230)

The operating unit 230 according to the present embodiment executes various operations on the basis of the code image I1 recognized by the recognition unit 210. Note that information may be read from the code image I1 by the recognition unit 210 or the operating unit 230.

In addition, the operation performed by the operating unit 230 according to the present embodiment is appropriately designed according to characteristics of the recognition device 20, a device on which the recognition device 20 is mounted, and an application or service that utilizes the composite image I3.

(Storage Unit 240)

The storage unit 240 according to the present embodiment stores information used by each component included in the recognition device 20. The storage unit 240 according to the present embodiment stores, for example, information regarding the recognizer used for recognition by the recognition unit 210, an image captured by the imaging unit 220, a program used for operation by the operating unit 230, and the like.

The functional configuration example of the recognition device 20 according to the present embodiment has been described above. Note that the functional configuration described above with reference to FIG. 4 is merely an example, and the configuration of the recognition device 20 according to the present embodiment is not limited thereto.

For example, the recognition device 20 according to the present embodiment may further include an operation unit that receives an operation by the user, a display unit that displays various types of information, and the like.

The functional configuration of the recognition device 20 according to the present embodiment can be flexibly modified according to specifications and operations.

1.3. Details of Learning

Next, learning by the learning device 10 according to the present embodiment will be described in detail. First, learning related to recognition of the composite image I3 by the learning device 10 will be described.

Figure 5:
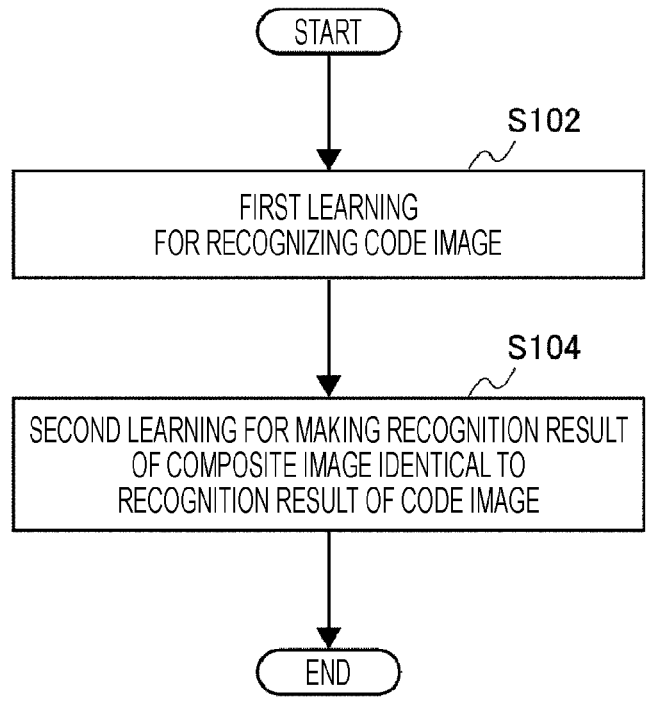
FIG. 5 is a flowchart simply illustrating an example of a flow of learning regarding recognition of the composite image I3 according to the embodiment.

FIG. 5 is a flowchart simply illustrating an example of a flow of learning regarding recognition of the composite image I3.

In the example illustrated in FIG. 5, the learning unit 110 first performs first learning for recognizing the code image I1 (S102), and then performs second learning for making the recognition result of the composite image I3 identical to the recognition result of the code image I1 (S104).

First, the first learning in step S102 will be described. Here, learning is performed in which a network D serving as a recognizer uses an input image a (which may not include the code image I1) as an input and generates an output b. The output b may include information regarding the position of the code image I1 and information encoded in the code image I1.

The relationship among the input image a, the network D, and the output b can be defined as following Expression (1).

[Expression 1]

$$b = D(a) \quad (1)$$

The first learning may use a data set including photographs obtained by imaging the code image I1 conforming to an arbitrary scheme in various sizes, positions, and orientations under a range of conditions (for example, lighting and the like). Accordingly, more robust recognition of the code image I1 is achieved.

The second learning in subsequent step S104 performs learning of extracting a reaction similar to that of the code image I1 from the network D while iteratively generating the composite image I3 as close to the cover image I2 as possible to the human eyes.

This optimization problem can be described as a minimization problem of a loss function as represented by following Expression (2).

[Expression 2]

$$\arg\min_{x} \mathbb{E}_{t \sim T} \sum_{k=0}^{n} \lambda_k \mathcal{L}_k \quad (2)$$

In Expression (2), x represents an input image iteratively updated to minimize the loss function, that is, the composite image I3. T is a distribution of differentiable image transformation functions t(x), and is selected to simulate the range of angles and distances from which the code image I1 is captured in real-life scenarios, camera specifications, lighting conditions, and the like.

Furthermore, in above Expression (2), $\lambda_k$ is a weight empirically set for a loss term $L_k$.

Note that $L_k$ may be defined as follows, for example.

$L_0(t(x), t(x_{cover}))$: distance between $t(x)$ and $t(x_{cover})$ (for example, the root mean square error). Here, $t(x)$ and $t(x_{cover})$ represent the results of applying the image transformation function t to the image x (composite image I3) and the image $x_{cover}$ (cover image I2), respectively.

$L_1(y, y_{code})$: distance between $y=F(t(x))$ and $y=F(t(x_{code}))$. Here, y and $y_{code}$ represent responses of the network D to $t(x)$ and $t(x_{code})$, respectively. Note that, in the above description, $x_{code}$ corresponds to the code image I1. In addition, the function F may be the same as the network D.

The other losses may be appropriately designed according to the code scheme to be adopted, characteristics of an application, and the like. For example, in a case where it is assumed that the composite image I3 is mainly printed using a standard color printer, a non-printability score or the like may be set as a loss.

The learning related to the recognition of the composite image I3 has been described above. According to the learning as described above, it is possible to generate a discriminator capable of recognizing the code image I1 from the composite image I3. Note that the generated discriminator is used by the recognition device 20.

Next, learning related to generation of the composite image I3 will be described. The composite image I3 according to the present embodiment is generated using a generator generated by learning based on the code image I1 and the cover image I2.

The generator may be generated by learning for bringing an output with the code image I1 being used as an input close to an output with the cover image I2 being used as an input.

Figure 6:
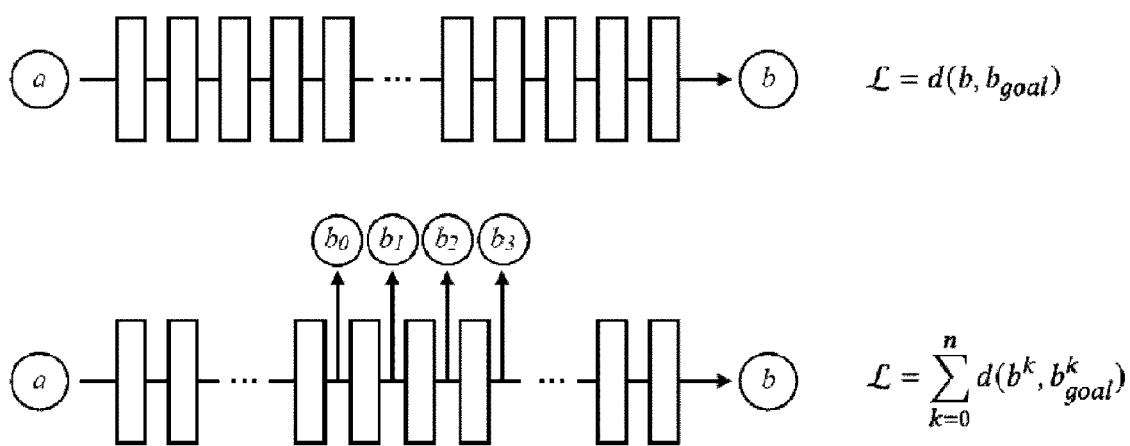
FIG. 6 is a diagram for describing learning regarding generation of the composite image I3 according to the embodiment.

FIG. 6 is a diagram for describing learning related to generation of the composite image I3.

The upper part of FIG. 6 illustrates a typical method of generating an adversarial example. In FIG. 6, a represents an input image, and b represents a final output of the network D. In addition, each rectangle represents an intermediate layer of the network D.

In the typical method of generating an adversarial example, the loss L is defined as, for example, a distance between b and $bb_{goal}$.

Here, b may be the final output of the network D with respect to the input image a (code image I1), and $b_{goal}$ may be the final output of the network D with respect to the input image $a_{goal}$ (cover image I2).

According to the learning using the loss defined as described above, it is possible to generate the composite image I3 changed so that the code image I1 is close to the cover image I2.

On the other hand, the output of an intermediate layer in a neural network may hold useful information depending on applications.

For example, in a case where two images (a photograph of a person's face and "Starry Night" by van Goff) are given, calculation is performed using intermediate responses of image classifier networks such as VGG-19 as an input, by which a new image incorporating the content of one of the images and the style of the other image can be created (for example, a new image having the person's face in the style of "Starry Night" is created).

From the above, the generator according to the present embodiment may be generated by learning for bringing an output of a predetermined intermediate layer with the code image I1 being used as an input close to an output of a predetermined intermediate layer with the cover image I2 being used as an input.

In this case, the loss L may be defined as a distance between an output $b^k$ and an output $b^k_{goal}$ of an intermediate layer k as illustrated in the lower part of FIG. 6.

Alternatively, in more detail, it may be defined as $L_1$ indicated by following Expression (3).

[Expression 3]

$$\mathcal{L}_1 = \sum_{l \in L} \sum_{i} [f^i_l(t(x)) - f^i_l(t(x_{code}))]^2 \quad (3)$$

In above Expression (3), $x_{code}$ represents the code image I1. Further, $f^i_1$ represents the i-th element of the intermediate output (that is, the feature amount map) of the network D at a layer l. In addition, L represents a set of intermediate layers whose outputs are taken into consideration in calculating L1.

According to $L_1$ defined as described above, the similarity between the composite image I3 to be generated and the cover image I2 can be adjusted by the definition of the set L. For example, in a case where the set L includes lower layers (layers close to the input) of the network D, it is expected that the recognition accuracy of the composite image I3 to be generated is improved while the possibility that the composite image looks like a code to human eyes increases.

Note that examples of other loss terms include a mean square error (L0) between X and)(cover, a color divergence score (L2) obtained by adding up the RGB variances of all pixels in calculating a difference between X and $X_{cover}$, and the like.

1.4. Application Example

Next, an application example of the composite image I3 according to the present embodiment will be described by way of specific examples. Although FIG. 2 illustrates a case where the composite image I3 according to the present embodiment is applied as a marker adapted to an environment, the composite image I3 according to the present embodiment is not limited to such an example and can be applied to various scenes.

FIG. 7 is a diagram for describing improvement in design by the composite image I3 according to the present embodiment.

A typical pizza package O2a is illustrated on the left side of FIG. 7. The typical pizza package O2a needs to have a code image I1 (barcode here) printed thereon for product control, and this leads to a decrease in design quality.

On the other hand, a package O2b to which the composite image I3 according to the present embodiment is applied is illustrated on the right side of FIG. 7. The package O2b has printed thereon the composite image I3 generated using a code image I1 and a cover image I2 representing a toque blanche, by which product control can be performed without printing a barcode.

As described above, according to the composite image I3 according to the present embodiment, it is possible to eliminate design restrictions such as printing of a barcode and improve design. Note that, although FIG. 7 illustrates the case where the composite image I3 is applied to a product package, improvement in design is similarly expected for posters, pamphlets, leaflets, and the like.

Figure 8:
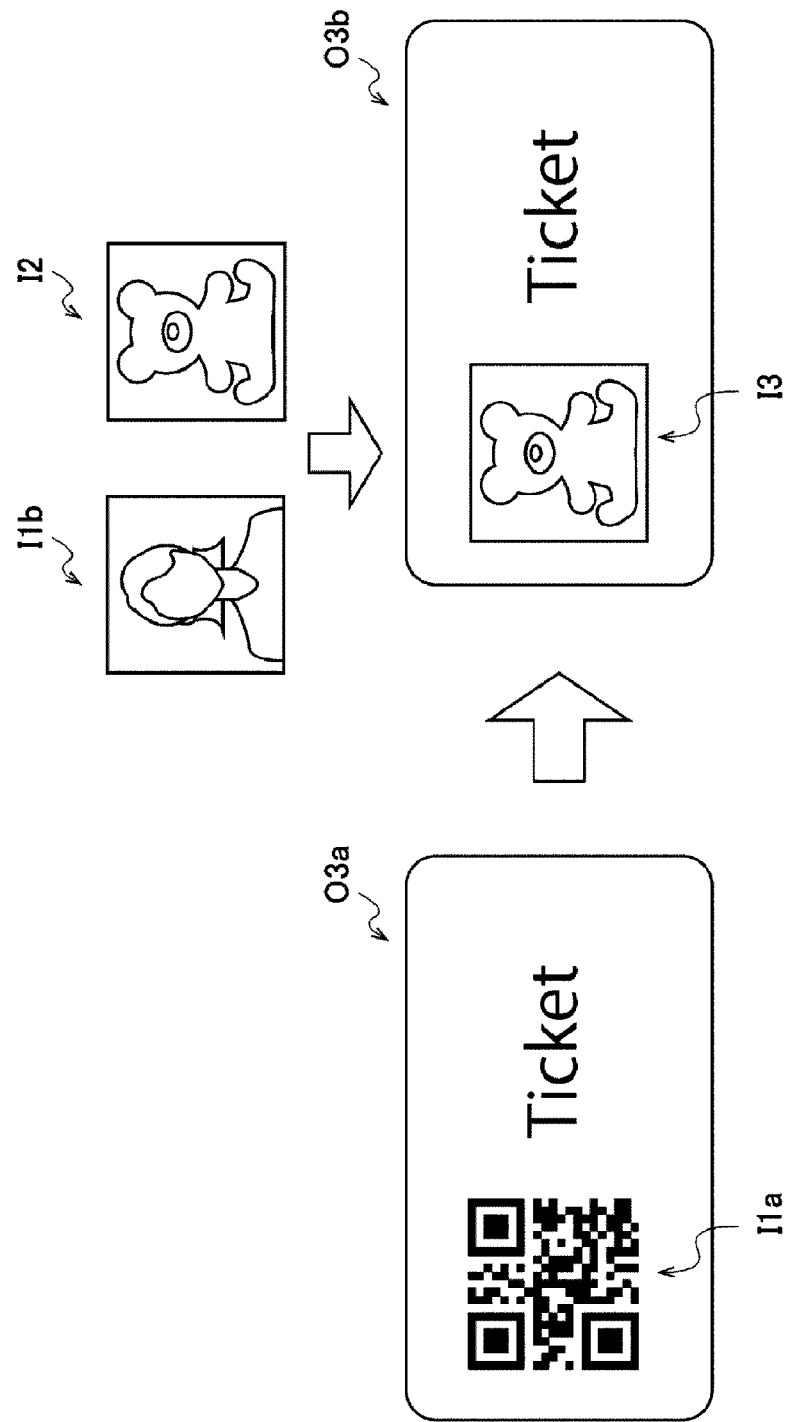
FIG. 8 is a diagram illustrating an example in which the composite image I3 according to the embodiment is applied to personal identification.

Next, a case where the composite image I3 according to the present embodiment is used for user identification will be described. FIG. 8 is a diagram illustrating an example in which the composite image I3 according to the present embodiment is applied to personal identification.

In recent years, there is a case where a ticket printed with a two-dimensional code that stores purchase information is issued in order to prevent counterfeiting and resale of tickets for a concert or the like. In addition, a system has been proposed in which a face image of a user is uploaded to a server when the user purchases a ticket, and personal identification using the face image is performed together with confirmation using a two-dimensional code when the user enters a venue. FIG. 8 illustrates, on the left side, a ticket O3a on which a code image I1a (QR code here) for the above-described purpose is printed.

On the other hand, FIG. 8 illustrates, on the right side, a ticket O3b on which a composite image I3 generated by using a code image I1b using a user's face image and a cover image I2 is printed. As described above, the code image I1 according to the present embodiment may be a face image.

In this case, the composite image I3 is generated by using a code image I1b uploaded by the user at the time of purchase of the ticket, and the code image I1b may be discarded without being stored in a server after generation of the composite image I3.

According to the ticket O3b described above, it is possible to simultaneously achieve forgery prevention, resale prevention, and personal identification based on the face image. Furthermore, the ticket O3b does not need to store the face image in the server for a long period of time, and thus is also useful from the viewpoint of personal information protection.

Note that the composite image I3 using the code image I1 employing such a face image can also be applied to, for example, an ID card. This application example can meet the need of a user who feels resistance in his/her face being printed on the card.

In addition, the composite image I3 as described above can be applied to a credit card. In this case, even if a third party illegally acquires and attempts to use the credit card, the face image (code image I1) can be confirmed in a cash register, and thus, an effect of preventing unauthorized use is also expected.

Next, a case where the composite image I3 according to the present embodiment is applied to a moving image will be described. The case where the composite image I3 according to the present embodiment is statically printed has been mainly described above, but the composite image I3 according to the present embodiment may be dynamically displayed.

Figure 9:
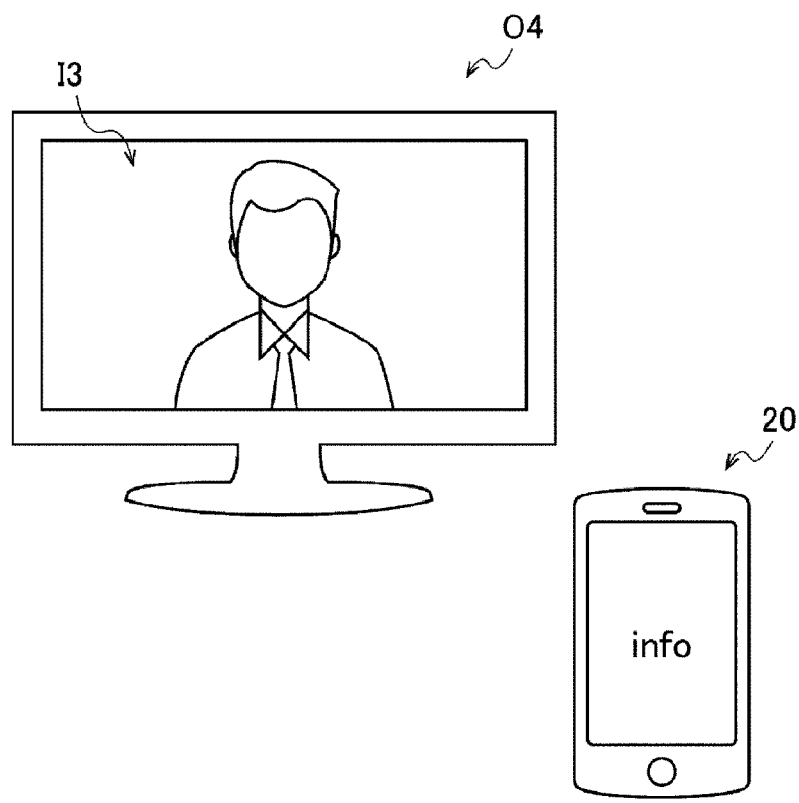
FIG. 9 is a diagram illustrating an example in which the composite image I3 according to the embodiment is applied to a moving image.

FIG. 9 is a diagram illustrating an example in which the composite image I3 according to the present embodiment is applied to a moving image. In the example illustrated in FIG. 9, the composite image I3 is generated using a broadcast program displayed on a television O4 as the cover image I2. In this case, the code image I1 storing any information is embedded in a frame of the video.

According to the above method, the user can acquire information distributed in association with the broadcast program using the recognition device 20 while viewing the broadcast program.

Furthermore, a distributor of the broadcast program can provide more information to viewers without dividing the screen.

Note that the application of the composite image I3 to the moving image is not limited to the broadcast program, and can be widely applied to digital signage and the like.

The application example of the composite image I3 according to the present embodiment has been described above by way of specific examples. Note that, although an example in which the composite image I3 according to the present embodiment is attached or displayed on a flat surface (two-dimension) has been described above, the composite image I3 according to the present embodiment can also be generated as a code (2.5 dimension) including a certain depth such as a manhole or a tile. Furthermore, the composite image I3 according to the present embodiment can also be implemented as, for example, a three-dimensional code such as an engraved work or a fake flower in which a code is embedded.

In addition, the composite image I3 according to the present embodiment can be generated by adjusting the robustness with respect to changes in distance, angle, lighting conditions, and the like as described above. Therefore, the composite image I3 according to the present embodiment can be generated according to use applications. For example, the composite image I3 can be generated so as to be recognizable only at close range or only from a specific angle.

2. Hardware Configuration Example

Figure 10:
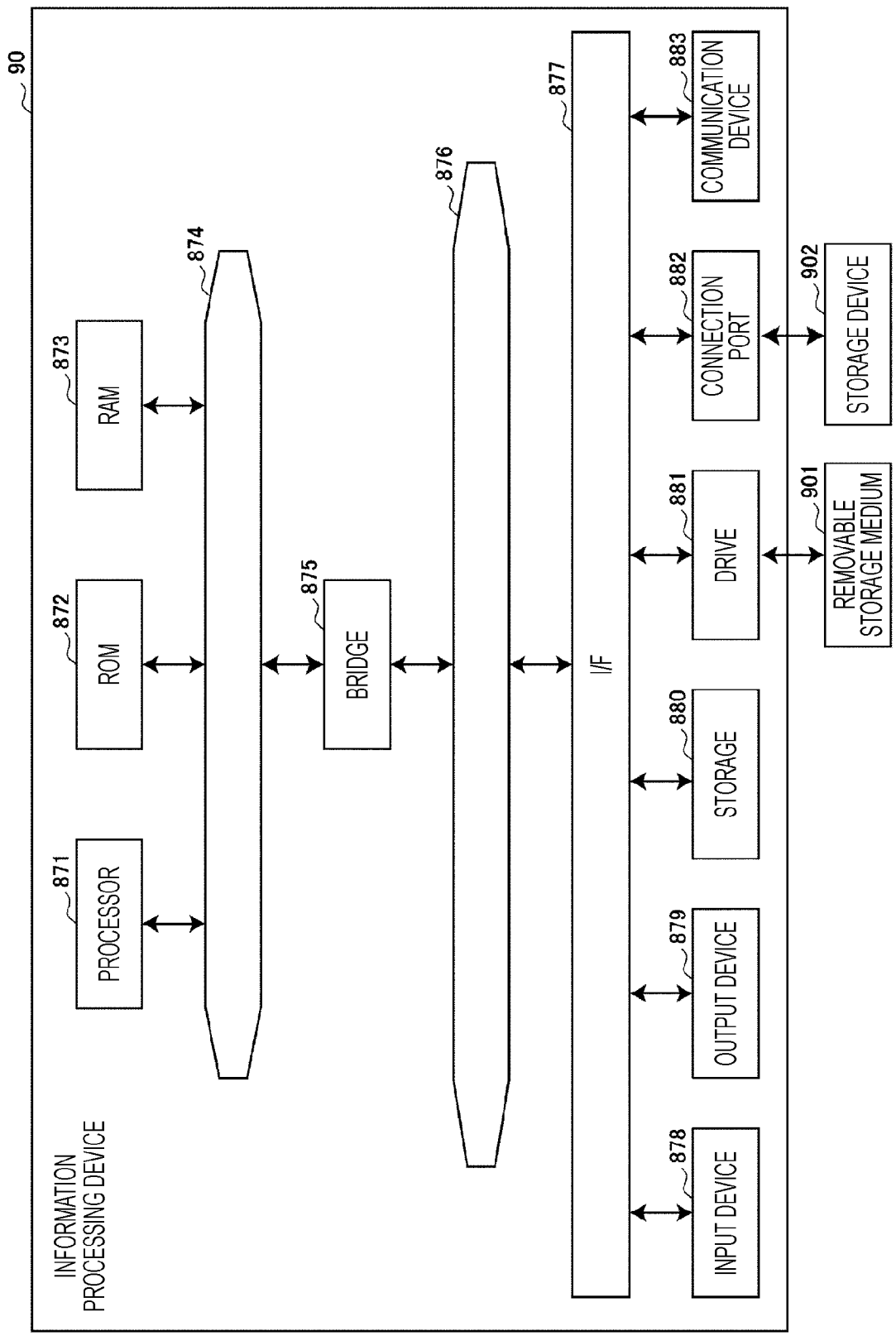
FIG. 10 is a block diagram illustrating a hardware configuration example of an information processing device 90 according to the embodiment.

Next, a hardware configuration example common to the learning device 10 and the recognition device 20 according to the embodiment of the present disclosure will be described. FIG. 10 is a block diagram illustrating a hardware configuration example of an information processing device 90 according to the embodiment of the present disclosure. The information processing device 90 may have a hardware configuration equivalent to that of each of the above-described devices. The information processing device 90 includes, for example, a processor 871, a read only memory (ROM) 872, a random access memory (RAM) 873, a host bus 874, a bridge 875, an external bus 876, an interface 877, an input device 878, an output device 879, a storage 880, a drive 881, a connection port 882, and a communication device 883 as illustrated in FIG. 10. Note that the hardware configuration illustrated here is an example, and some of the components may be eliminated. In addition, components other than the components shown here may be further included.

(Processor 871)

The processor 871 functions as, for example, an arithmetic processing device or a control device, and controls the overall operation of each component or a part thereof on the basis of various programs recorded in the ROM 872, the RAM 873, the storage 880, or a removable recording medium 901.

(ROM 872, RAM 873)

The ROM 872 is a unit that stores a program read by the processor 871, data used for calculation, and the like. The RAM 873 temporarily or permanently stores, for example, a program read by the processor 871, various parameters that appropriately change when the program is executed, and the like.

(Host Bus 874, Bridge 875, External Bus 876, Interface 877)

The processor 871, the ROM 872, and the RAM 873 are mutually connected via, for example, the host bus 874 capable of high-speed data transmission. On the other hand, the host bus 874 is connected to the external bus 876 having a relatively low data transmission speed via the bridge 875, for example. In addition, the external bus 876 is connected to various components via the interface 877.

(Input Device 878)

As the input device 878, a component such as a mouse, a keyboard, a touch panel, a button, a switch, and/or a lever may be applied, for example. Furthermore, as the input device 878, a remote controller (hereinafter referred to as a remote) capable of transmitting a control signal using infrared rays or other radio waves may be used. Furthermore, the input device 878 includes a voice input device such as a microphone.

(Output Device 879)

The output device 879 is a device capable of visually or audibly notifying the user of acquired information, such as a display device such as a cathode ray tube (CRT), an LCD, or an organic EL, an audio output device such as a speaker or a headphone, a printer, a mobile phone, or a facsimile. In addition, the output device 879 according to the present disclosure includes various vibration devices capable of outputting tactile stimulation.

(Storage 880)

The storage 880 is a device for storing various kinds of data. As the storage 880, a magnetic storage device such as a hard disk drive (HDD), a semiconductor storage device, an optical storage device, a magneto-optical storage device, or the like is used, for example.

(Drive 881)

The drive 881 is, for example, a device that reads information recorded on the removable recording medium 901 such as a magnetic disk, an optical disk, a magneto-optical disk, or a semiconductor memory, or writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Obviously, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication apparatus for connecting to a network, and is, for example, a communication card for wired or wireless LAN, Bluetooth (registered trademark), or wireless USB (WUSB), a router for optical communication, a router for asymmetric digital subscriber line (ADSL), a modem for various communications, or the like.

3. Summary

As described above, the recognition device 20 according to the embodiment of the present disclosure includes the recognition unit 210 that recognizes, from a composite image generated using a code image and a cover image, the code image. In addition, one of the features of the recognition unit 210 according to the embodiment of the present disclosure is to recognize the code image from the composite image using a recognizer trained so that a recognition result of the code image and a recognition result of the composite image are identical to each other.

According to the above configuration, it is possible to implement practical application of a code that is more adapted to an environment.

While a preferred embodiment of the present disclosure has been described above in detail with reference to the drawings, the technical scope of the present disclosure is not limited thereto. It is obvious that a person having ordinary knowledge in the technical field of the present disclosure could arrive at various changes or modifications within the scope of the technical idea set forth in the claims, and it is understood that such changes or modifications naturally belong to the technical scope of the present disclosure.

In addition, each step related to the processing described in the present specification is not necessarily processed in time series in the order described in the flowchart or the sequence diagram. For example, the processes of the respective steps in the flowchart may be performed in an order different from the described order, or may be performed in parallel.

In addition, the series of processing by the respective devices described in the present specification may be implemented using any of software, hardware, and a combination of software and hardware. A program constituting the software is stored in advance in, for example, a recording medium (non-transitory medium) provided inside or outside each device. Then, each program is read into the RAM at the time of execution by the computer, for example, and is executed by various processors. The recording medium is, for example, a magnetic disk, an optical disk, a magneto-optical disk, a flash memory, or the like. In addition, the computer program described above may be distributed via, for example, a network without using a recording medium.

Further, the effects described in the present specification are merely explanatory or exemplary, and are not restrictive. That is, the technology according to the present disclosure may provide other effects that are apparent to those skilled in the art from the description of the present specification, in addition to or instead of the abovementioned effects.

Note that the following configurations also belong to the technical scope of the present disclosure.

(1)
An information processing device including
a recognition unit that recognizes, from a composite image generated using a code image and a cover image, the code image, in which
the recognition unit recognizes the code image from the composite image using a recognizer trained so that a recognition result of the code image and a recognition result of the composite image are identical to each other.

(2)
The information processing device according to (1), in which
the composite image has higher pixel-based similarity to the cover image than the code image.

(3)
The information processing device according to (1) or (2), in which
the recognizer is generated by first learning for recognizing the code image and second learning for making the recognition result of the composite image identical to the recognition result of the code image.

(4)
The information processing device according to any one of (1) to (3), in which
the cover image is selected according to an environment in which the composite image is attached or displayed.

(5)
The information processing device according to (4), in which
the cover image includes an image that reproduces a texture of an object to which the composite image is attached or displayed.

(6)
The information processing device according to any one of (1) to (5), in which
the code image includes a two-dimensional code.

(7)
The information processing device according to any one of (1) to (5), in which
the code image includes a face image.

(8)
The information processing device according to any one of (1) to (7), in which
the composite image includes an image from which the code image is unrecognizable by another recognition device that is capable of recognizing the code image on the basis of a certain image feature from the composite image on the basis the certain image feature.

(9)
The information processing device according to any one of (1) to (8), in which
the composite image is generated using a generator that is generated by learning based on the code image and the cover image.

(10)
The information processing device according to (9), in which
the generator is generated by learning for bringing an output with the code image being used as an input close to an output with the cover image being used as an input.

(11)
The information processing device according to (10), in which
the generator is generated by learning for bringing an output of a predetermined intermediate layer with the code image being used as an input close to an output of a predetermined intermediate layer with the cover image being used as an input.

(12)
The information processing device according to any one of (1) to (11), further including
an imaging unit that captures the composite image.

(13)
The information processing device according to any one of (1) to (12), further including
an operating unit that operates on the basis of the code image recognized by the recognition unit.

(14) An information processing method including
recognizing, from a composite image generated using a code image and a cover image, the code image by a processor, in which
the recognizing further includes recognizing the code image from the composite image using a recognizer trained so that a recognition result of the code image and a recognition result of the composite image are identical to each other.

(15)
A program for causing a computer to function as an information processing device that includes
a recognition unit that recognizes, from a composite image generated using a code image and a cover image, the code image, in which the recognition unit recognizes the code image from the composite image using a recognizer trained so that a recognition result of the code image and a recognition result of the composite image are identical to each other.

REFERENCE SIGNS LIST

10 Learning device
110 Learning unit
120 Storage unit
20 Recognition device
210 Recognition unit
220 Imaging unit
230 Operating unit
240 Storage unit

The invention claimed is:

1. An information processing device, comprising:
at least one processor configured to:
recognize, from a composite image generated using a code image and a cover image, the code image using a recognizer, wherein
the recognizer is trained such that a recognition result of the code image is identical to a recognition result of the composite image, and
the composite image has higher pixel-based similarity to the cover image than the code image.

2. The information processing device according to claim 1, wherein the at least one processor is further configured to generate the recognizer by a first learning process for recognition of the code image and a second learning process for extraction of the recognition result of the composite image identical to the recognition result of the code image.

3. The information processing device according to claim 1, wherein the at least one processor is further configured to select the cover image according to an environment in which the composite image is one of attached or displayed.

4. The information processing device according to claim 3, wherein the cover image includes an image that reproduces a texture of an object to which the composite image is one of attached or displayed.

5. The information processing device according to claim 1, wherein the code image includes a two-dimensional code.

6. The information processing device according to claim 1, wherein the code image includes a face image.

7. The information processing device according to claim 1, wherein the composite image includes an image from which the code image is unrecognizable by a specific recognition device that is configured to recognize the code image.

8. The information processing device according to claim 1, wherein the at least one processor is further configured to:
generate a generator by a learning process; and
generate the composite image using the generator based on the code image and the cover image.

9. The information processing device according to claim 8, wherein the at least one processor is further configured to generate the generator by the learning process to bring an output with the code image used as an input close to an output with the cover image used as an input.

10. The information processing device according to claim 9, wherein the at least one processor is further configured to generate the generator by the learning process to bring an output of a first intermediate layer with the code image used as the input close to an output of a second intermediate layer with the cover image used as the input.

11. The information processing device according to claim 1, further comprising an imaging element configured to capture the composite image.

12. The information processing device according to claim 1, wherein the at least one processor is further configured to control an operation based on the recognized code image.

13. An information processing method, comprising:
recognizing, from a composite image generated using a code image and a cover image, the code image using a recognizer, wherein
the recognizer is trained such that a recognition result of the code image is identical to a recognition result of the composite image, and
the composite image has higher pixel-based similarity to the cover image than the code image.

14. A non-transitory computer-readable medium having stored thereon, computer-executable instructions which, when executed by a computer, cause the computer to execute operations, the operations comprising
recognizing, from a composite image generated using a code image and a cover image, the code image using a recognizer, wherein
the recognizer is trained such that a recognition result of the code image is identical to a recognition result of the composite image, and
the composite image has higher pixel-based similarity to the cover image than the code image.

* * * * *